United States Patent
Gao et al.

(10) Patent No.: US 9,214,053 B2
(45) Date of Patent: Dec. 15, 2015

(54) AUTOMATIC VENDING MACHINE

(71) Applicant: ShenZhen Treasure City Technology Co., LTD., ShenZhen (CN)

(72) Inventors: Zhi-Yong Gao, Wuhan (CN); Yu-Lin Liu, Wuhan (CN)

(73) Assignee: ShenZhen Treasure City Co., LTD., ShenZhen (CN)

( * ) Notice: Subject to any disclaimer, the term of this patent is extended or adjusted under 35 U.S.C. 154(b) by 56 days.

(21) Appl. No.: 13/966,504

(22) Filed: Aug. 14, 2013

(65) Prior Publication Data

US 2014/0175109 A1   Jun. 26, 2014

(30) Foreign Application Priority Data

Dec. 22, 2012   (CN) .......................... 2012 1 0561768

(51) Int. Cl.
| | |
|---|---|
| *B65G 59/00* | (2006.01) |
| *B65H 3/00* | (2006.01) |
| *G07F 11/00* | (2006.01) |
| *G07F 11/16* | (2006.01) |
| *F16H 19/04* | (2006.01) |
| *G07F 9/00* | (2006.01) |

(52) U.S. Cl.
CPC .............. *G07F 11/005* (2013.01); *G07F 11/16* (2013.01); *F16H 19/04* (2013.01); *G07F 9/00* (2013.01); *G07F 11/00* (2013.01)

(58) Field of Classification Search
CPC ......... F16H 19/04; G07F 11/005; G07F 9/00; G07F 11/16; G07F 11/00

USPC ................................................ 221/12; 74/30
See application file for complete search history.

(56) References Cited

U.S. PATENT DOCUMENTS

| | | | | | |
|---|---|---|---|---|---|
| 2,766,822 | A | * | 10/1956 | Potter ............................ | 160/201 |
| 3,269,595 | A | * | 8/1966 | Krakauer et al. ............... | 221/75 |
| 3,344,953 | A | * | 10/1967 | Krakauer et al. ............... | 221/75 |
| 3,901,366 | A | * | 8/1975 | Schuller et al. ................. | 194/210 |
| 6,994,409 | B2 | * | 2/2006 | Godlewski ..................... | 312/297 |
| 7,591,397 | B2 | * | 9/2009 | Leonetti ......................... | 221/133 |
| 2001/0000609 | A1 | * | 5/2001 | Rudick et al. .................. | 221/6 |
| 2006/0083592 | A1 | * | 4/2006 | Aughton et al. ............... | 405/100 |
| 2008/0264967 | A1 | * | 10/2008 | Schifman et al. ............. | 221/133 |

FOREIGN PATENT DOCUMENTS

JP          2000036070 A   *   2/2000

* cited by examiner

*Primary Examiner* — Rakesh Kumar
(74) *Attorney, Agent, or Firm* — Novak Druce Connolly Bove + Quigg LLP

(57) ABSTRACT

A vending machine proofed against the pinching of a customer's fingers and with a security feature includes a cabinet, a receiving tray, a shielding board, and gear wheels. The cabinet includes a cabinet body and a door rotatably attached to the cabinet body. A number of merchandise shelves are located in the cabinet body. A through opening is defined in the door. The receiving tray is attached to an inside of the receiving tray and aligned with the through opening. The shielding board covers the through opening and is toothed to allow lowering for access by the customer to the bought merchandise when the internal drop of an item of merchandise is sensed and raising after the sensed removal of the item.

17 Claims, 5 Drawing Sheets

AUTOMATIC VENDING MACHINE

BACKGROUND

1. Technical Field

The present disclosure relates to vending machines.

2. Description of Related Art

Vending machines allow customers to buy merchandise twenty four hours a day. When the customer retrieves the merchandise from the vending machine, a shielding plate is pushed to rotate by the customer to obtain the merchandise from inside a cabinet of the vending machine. However, when the customer catches the merchandise, the shielding plate may fall and pinch the fingers of the customer. Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
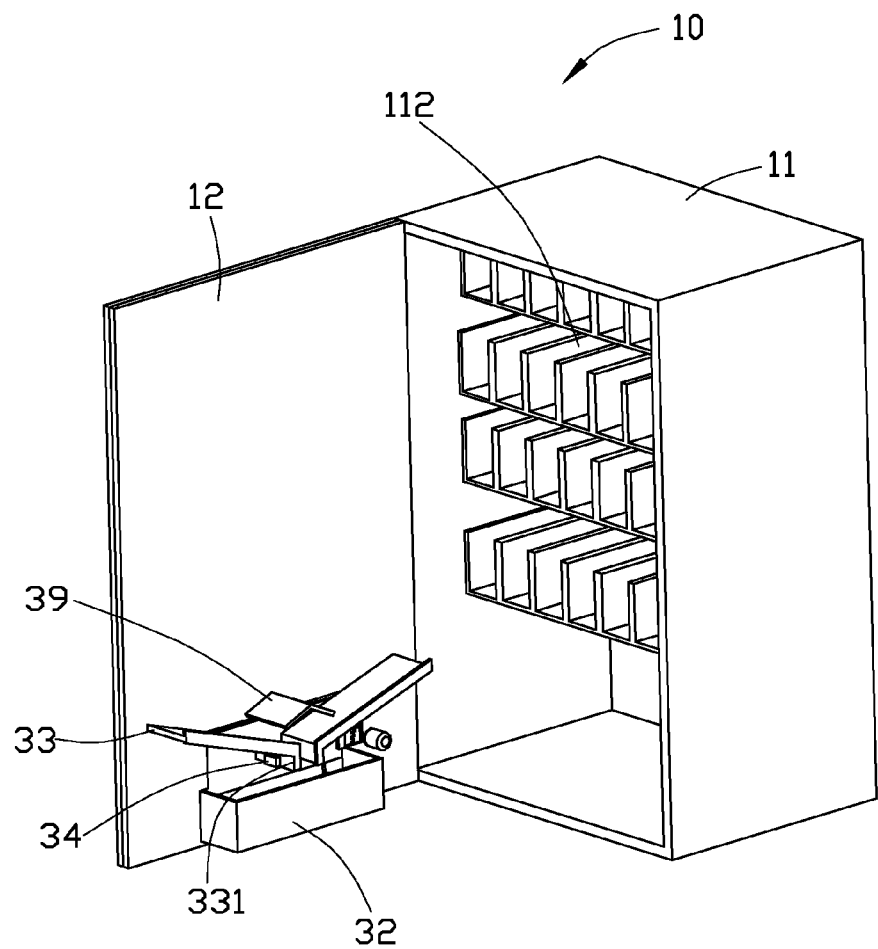
FIG. 1 is an isometric view of an automatic vending machine in accordance with an embodiment.
Figure 2:
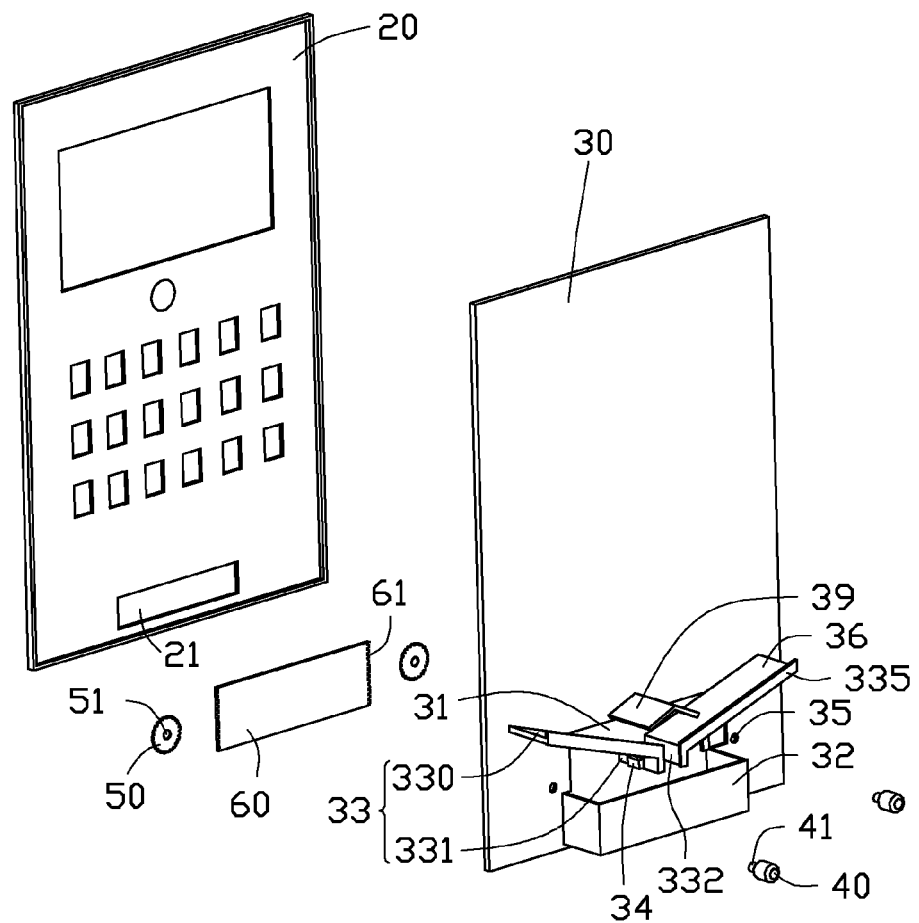
FIG. 2 is an exploded, isometric view of a door of the automatic vending machine of FIG. 1.

FIGS. 1 and 2 illustrate an automatic vending machine in accordance with an embodiment. The automatic vending machine comprises a cabinet 10 and a plurality of merchandise shelves 112 received in the cabinet 10. The cabinet 10 comprises a cabinet body 11 and a door 12 rotatably attached to the cabinet body 11.

The door 12 comprises a front plate 20 and a securing plate 30. A through opening 21 is defined in the bottom of the front plate 20. An opening 31, communicating with the through opening 21, is defined in the securing plate 30. The opening 31 is substantially rectangular. A receiving tray 32 extends from edges of the opening 31. A first merchandise guiding member 33 and a second merchandise guiding member 36 extend from the securing plate 30 and are located above the receiving tray 32. In one embodiment, the first merchandise guiding member 33 and the second merchandise guiding member 36 are slanted relative to the door 12 and oppose each other.

The respective positions of the first merchandise guiding member 33 and the second merchandise guiding member 36 form a symmetry, so that the first merchandise guiding member 33 and the second merchandise guiding member 36 have a same configuration. Each of the first merchandise guiding member 33 and the second merchandise guiding member 36 comprises a guiding panel 330, a limiting panel 331 connected to the guiding panel 330, and a shielding flange 335 connected to the guiding panel 330 and the limiting panel 331. The shielding flange 335 extends from edges of the guiding panel 330 and the limiting panel 331, and prevent merchandise from moving backwards out of the first merchandise guiding member 33 and the second merchandise guiding member 36. In one embodiment, the guiding panel 330 is slanted relative to the limiting panel 331, and an obtuse angle is defined between the guiding panel 330 and the limiting panel 331. The limiting panel 331 is substantially perpendicular to the securing plate 30. In one embodiment, the limiting panels 331 of the first merchandise guiding member 33 and the second merchandise guiding member 36 are substantially parallel to each other, so that a merchandise entrance 332 is defined between the two limiting panels 331.

A sensor 34 is secured to the limiting panel 331 of the first merchandise guiding member 33. When a bought item of merchandise drops into the receiving tray 32 via the merchandise entrance 332, the sensor 34 detects that the item has dropped into the receiving tray 32. A shielding plate 39 is located above the opening 31 and aligned with the merchandise entrance 332. The shielding plate 39 is configured to prevent thieving by impeding access to the cabinet and the merchandise shelves 112 via the opening 31. Two securing holes 35 are defined in the securing plate 30 and located at opposite sides of the opening 31.

Two driving members 40 are secured to the securing plate 30, and each driving member 40 comprises a rotating shaft 41. In one embodiment, each driving member 40 is a motor. Two wheel gears 50 are secured to the two driving members 40, and each wheel gear 50 defines a mounting hole 51. The two wheel gears 50 have a same diameter. A shielding board 60 covers the through opening 21. In one embodiment, the shielding board 60 is substantially rectangular, and two toothed bars 61 are located on opposite sides of the shielding board 60.

Figure 3:
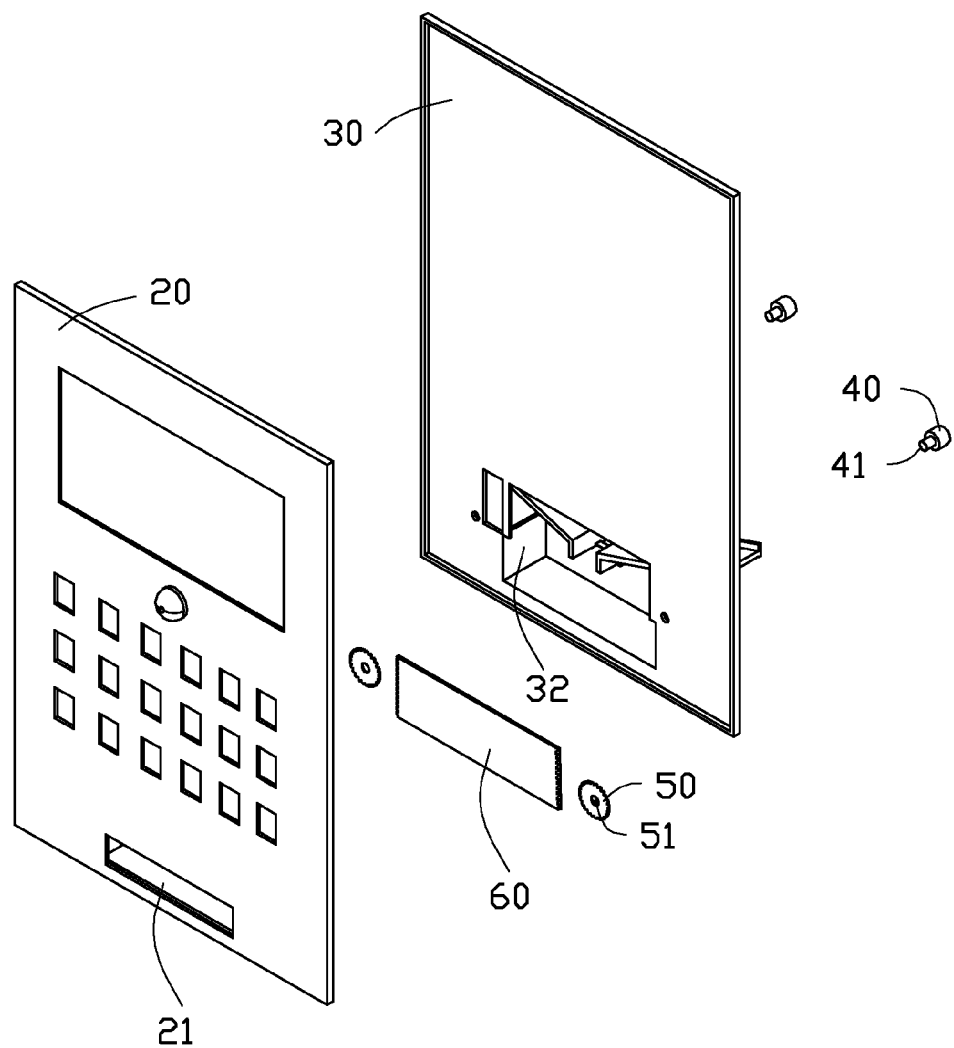
FIG. 3 is similar to FIG. 2, but viewed from a different aspect.
Figure 4:
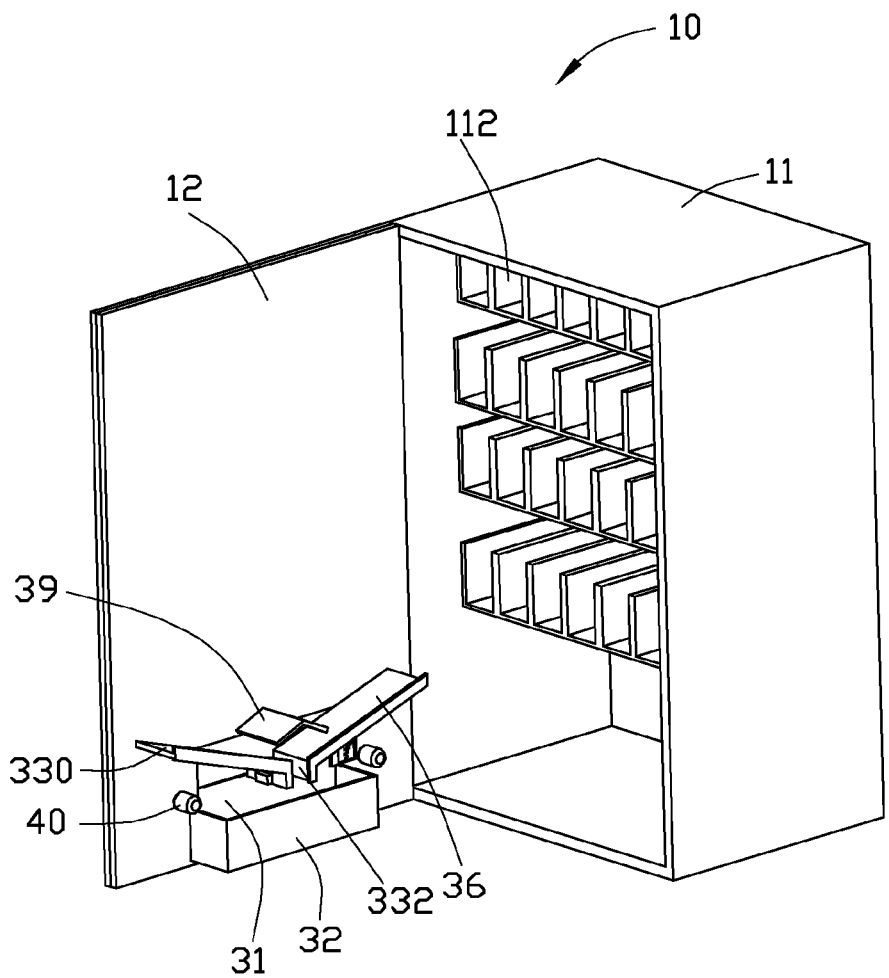
FIG. 4 is an assembled view of the automatic vending machine of FIG. 1.
Figure 5:
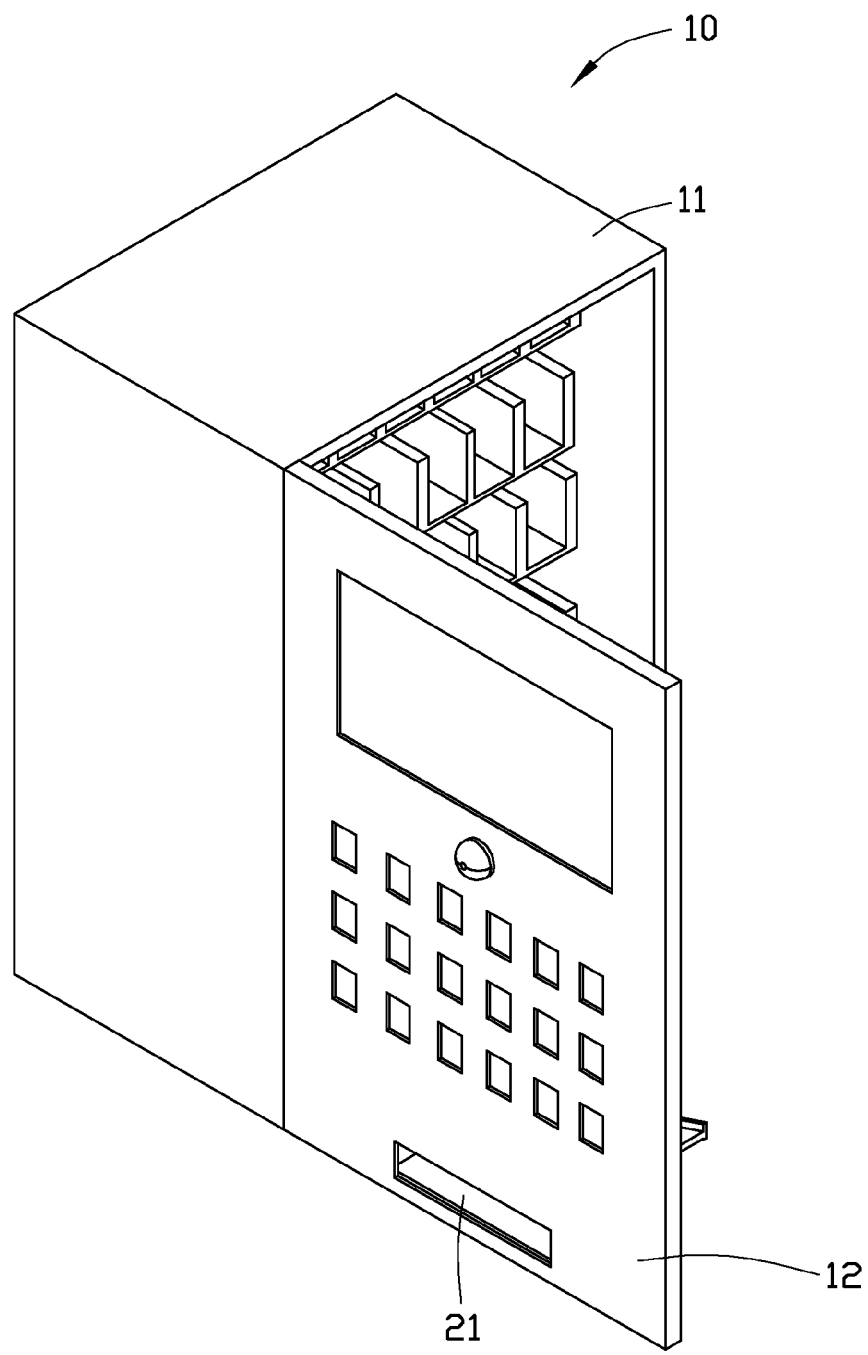
FIG. 5 is similar to FIG. 4, but viewed from a different aspect.

FIGS. 3-4 illustrate assembly of the automatic vending machine in accordance with an embodiment. In assembly, the two driving members 40 are located on the inside of the securing plate 30. The two wheel gears 50 are located on the outside of the securing plate 30, and the mounting holes 51 are aligned with the securing holes 35. Each rotating shaft 41 of the two driving members 40 extends through each securing hole 35 and engages in a mounting hole 51, so that the two driving members 40 are secured to the two wheel gears 50. The shielding board 60 is aligned with the opening 31, and the toothed bar 61 meshes with the two gear wheels 50. Thus, the shielding board 60 is secured and located between the two gear wheels 50. The front plate 20 is attached to the outside of the securing plate 30, and the shielding board 60 covers the through opening 21.

In use, a bought item of merchandise drops into the first merchandise guiding member 33 or the second merchandise guiding members 36 from the merchandise shelves 112 and further drops into the receiving tray 32 via the merchandise entrance 332. The sensor 34 detects that the merchandise has dropped into the receiving tray 32 and rotates the two driving member 40 in a first direction. When the two driving member 40 are rotated in the first direction, the two wheel gears 50 are rotated to move the shielding board 60 downwards. Thus, the through opening 21 is not covered by the shielding board 60, and customer can access and pick up the merchandise from the through opening 21. After customer removes the merchandise, the sensor 34 detects the absence of merchandise in the receiving tray 32 and rotates the two driving member 40 in a second opposite direction. When the two driving member 40 are rotated in the second direction, the two wheel gears 50 are rotated to move the shielding board 60 upwards relative to the securing plate 30, so that the shielding board 60 again covers the through opening 21.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An automatic vending machine comprising:
    a cabinet comprising a cabinet body and a door, rotatably attached to the cabinet body; a plurality of merchandise shelves, located in the cabinet body, configured to receive merchandise, and a through opening defined in the door, and the door comprising a securing plate;
    a receiving tray attached to an inside of the cabinet body and aligned with the through opening; the receiving tray being opened and configured to receive the merchandise from the plurality of merchandise shelves;
    a shielding board comprising a teethed bar; the shielding board covering the through opening;
    a wheel gear secured to the door and meshing with the teethed bar; and
    a driving member located on an inside of the securing plate, wherein the shielding board is located on an outside of the securing plate, the driving member comprises a rotating shaft, and the rotating shaft extends through the securing plate and is engaged with the wheel gear;
    wherein the shielding board is moveable relative to the door by the wheel gear, to communicate the through opening with the inside of the receiving tray.

2. The automatic vending machine of claim 1, wherein the shielding board is moveable in a direction that is substantially parallel to the door.

3. The automatic vending machine of claim 1, wherein an opening is defined in the securing plate, and the receiving tray is connected to edges of the opening.

4. The automatic vending machine of claim 3, wherein the door further comprises a front plate secured to the securing plate, the through opening is defined in the front plate, and the shielding board is located between the front plate and the securing plate.

5. The automatic vending machine of claim 1, wherein a first merchandise guiding member is located above the receiving tray, and the first merchandise guiding member is slanted relative to the door.

6. The automatic vending machine of claim 5, wherein a sensor is secured to the first merchandise guiding member, and the sensor is configured to detect whether a merchandise drops into the receiving tray to start the driving member.

7. The automatic vending machine of claim 5, wherein the first merchandise guiding member comprises a first guiding panel and a first limiting panel connected to the first guiding panel, the first limiting panel is substantially perpendicular to the securing plate, and an obtuse angle is defined between the first limiting panel and the first guiding panel.

8. The automatic vending machine of claim 7, wherein the first merchandise guiding member further comprises a shielding flange extending from the first guiding panel and the first limiting panel, and the shielding flange is configured to prevent merchandise from moving out of the first merchandise guiding member.

9. The automatic vending machine of claim 7, wherein a second merchandise guiding member is located above the receiving tray and comprises a second guiding panel and a second limiting panel; the first guiding panel is slanted relative to the door, the second limiting panel is substantially parallel to the first limiting panel; and a merchandise entrance is defined between the first limiting panel and the second limiting panel.

10. An automatic vending machine comprising:
    a cabinet comprising a cabinet body and a door, rotatably attached to the cabinet body; a plurality of merchandise shelves, located in the cabinet body, configured to receive merchandise; the door comprising a securing plate and a front plate attached to the securing plate; and a through opening defined in the front plate;
    a receiving tray attached to an inside of the securing plate; the receiving tray being opened and configured to receive the merchandise from the plurality of merchandise shelves;
    a shielding board located between the securing plate and the front plate; the shielding board comprising a teethed bar; and
    a wheel gear secured to the door and meshing with the teethed bar; and
    a driving member located on the inside of the securing plate, wherein the shielding board is located on an outside of the securing plate, the driving member comprises a rotating shaft, and the rotating shaft extends through the securing plate and is engaged with the wheel gear;
    wherein the shielding board is moveable relative to the door by the wheel gear between a close position, where the shielding board covers the through opening; and an open position, where the shielding board is moved away from the through opening, and the through opening communicates with the receiving tray.

11. The automatic vending machine of claim 10, wherein the shielding board is moveable in a direction that is substantially parallel to the door.

12. The automatic vending machine of claim 10, wherein a first merchandise guiding member is located above the receiving tray, and the first merchandise guiding member is slanted relative to the door.

13. The automatic vending machine of claim 12, wherein a sensor is secured to the first merchandise guiding member, and the sensor is configured to detect whether a merchandise drops into the receiving tray to start the driving member.

14. The automatic vending machine of claim 12, wherein the first merchandise guiding member comprises a first guiding panel and a first limiting panel connected to the first guiding panel; the first limiting panel is substantially perpendicular to the securing plate, and an obtuse angle is defined between the first limiting panel and the first guiding panel.

15. The automatic vending machine of claim 14, wherein the first merchandise guiding member further comprises a shielding flange extending from the first guiding panel and the first limiting panel, and the shielding flange is configured to prevent merchandise from moving out of the first merchandise guiding member.

16. The automatic vending machine of claim 15, wherein a second merchandise guiding member is located above the receiving tray and comprises a second guiding panel and a second limiting panel; the first guiding panel is slanted relative to the door, the second limiting panel is substantially parallel to the first limiting panel; and a merchandise entrance is defined between the first limiting panel and the second limiting panel.

17. The automatic vending machine of claim 16, wherein an opening is defined in the securing plate, the receiving tray is connected to edges of the opening; a shielding plate is secured to the inside of the securing plate and aligned with the merchandise entrance; and the shielding plate is located above the opening and configured to prevent the merchandise on the plurality of merchandise shelves from thieved via the opening.

\* \* \* \* \*